United States Patent
Li

(10) Patent No.: US 6,565,316 B2
(45) Date of Patent: May 20, 2003

(54) ADJUSTABLE AND STABLE PRE-LOADING DEVICE EQUIPPED FAN

(75) Inventor: Chien-Chung Li, Taoyuan Hsien (TW)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 09/924,532

(22) Filed: Aug. 9, 2001

(65) Prior Publication Data

US 2002/0031428 A1 Mar. 14, 2002

(30) Foreign Application Priority Data

Sep. 8, 2000 (TW) ........................................ 89118381 A

(51) Int. Cl.7 .............................................. F01D 25/00
(52) U.S. Cl. ................. 415/229; 415/170.1; 415/174.2; 416/205; 384/581; 417/423.12
(58) Field of Search ................................. 415/229, 104, 415/170, 174.2, 220; 416/205, 206; 384/581, 99, 517, 512; 417/423.12, 423.15, 353, 354

(56) References Cited

U.S. PATENT DOCUMENTS

| | | | | |
|---|---|---|---|---|
| 2,953,417 A | * | 9/1960 | Horeberg | |
| 3,329,845 A | * | 7/1967 | Lear | |
| 3,746,472 A | * | 7/1973 | Rupp | 417/9 |
| 3,816,782 A | * | 6/1974 | Dow et al. | 310/90 |
| 4,164,690 A | * | 8/1979 | Muller et al. | 318/254 |
| 4,203,704 A | * | 5/1980 | Saint-Amand | 416/93 R |
| 4,621,977 A | * | 11/1986 | Markwardt' | 416/5 |
| 4,719,352 A | * | 1/1988 | Miyatake et al. | 250/351 |
| 4,958,945 A | * | 9/1990 | Nakanishi | 384/512 |
| 5,997,183 A | * | 12/1999 | Horng | 384/517 |

* cited by examiner

Primary Examiner—Edward K. Look
Assistant Examiner—James M McAleenan
(74) Attorney, Agent, or Firm—Birch, Stewart, Kolasch & Birch, LLP

(57) ABSTRACT

An adjustable and stable pre-loading device equipped fan includes a stator, a first rigid spacer, a first bearing, an elastic device, a second bearing, a second rigid spacer, a rotor and a shaft. Among these, the stator includes a receptacle. The first bearing is formed on the first rigid spacer in the receptacle. The elastic device is formed in the receptacle and further on the first bearing. The second rigid spacer is formed on the second bearing on the elastic device. The rotor is coupled to the stator and has a blade structure. The first rigid spacer compresses the elastic device by means of the first bearing. The second rigid spacer compresses the elastic device by means of the second bearing. The distance between the first rigid spacer and the second rigid spacer is adjustable, thereby altering pre-loading applied on the first bearing and the second bearing.

10 Claims, 4 Drawing Sheets

ADJUSTABLE AND STABLE PRE-LOADING DEVICE EQUIPPED FAN

BACKGROUND OF THE INVENTION

1. Field of the Invention

The present invention relates to a fan, and more particularly to an adjustable and stable pre-loading device equipped fan.

2. Description of the Prior Art

As shown in FIG. 1(a), the conventional fan 10 includes a stator 20, at least one bearing 30, a rotor 50, a shaft 60 and a spring 70. The rotor 50 further includes a blade structure 55. Besides, the shaft 60 couples the rotor 50 to the bearing 30. As such, the shaft 60 enables the blade structure 55 of the rotor 50 to rotate. The shaft 60 passes through and compresses the spring 70, and then is coupled to the bearing 30. As such, the spring 70 applies a downward force, generally called pre-loading force, on the bearing 30.

Referring to FIG. 1(a) and FIG. 1(b), the bearing 30 is positioned on the bottom of the stator 20. In addition, the bearing 30 is composed of an inner ring 31, a plurality of balls 32 and an outer ring 33. The balls 32 couple the outer ring 33 to the outer periphery of the inner ring 31. During the inner ring 31 rotates respective to the outer ring 33, the balls 32 touch the inner ring 31 as well as the outer ring 33 and thus form the first contact 35 and the second contact 36, respectively. However, the prior art suffers from the problem that the pre-loading force is unstable. For example, the contacts may shift and the pre-loading force fails to be kept constant. The problem and the reason are described in detail as follows. The blade structure 55 may move vertically or horizontally due to some reasons, such as the flow disturbs the blade structure 55. In this case, the spring 70 maybe sometimes compressed and sometimes relaxed. As such, the spring 70 fails to apply constant pre-loading force on the bearing 30, and the first contact 35 and the second contact 36 do not stay at the same positions. As a result, the fan suffers form shake, noise and abrasion.

Besides, prior art fails to adjust the pre-loading force according to the requirement of the user since the spring 70 has been formed previously and thus has no adjustable elastic coefficient.

Accordingly, there has been a strongly felt need for a novel fan having stable pre-loading to solve the above-mentioned problem. Besides, it is desired that the applied pre-loading force is adjustable.

SUMMARY OF THE INVENTION

The present invention discloses an adjustable and stable pre-loading device equipped fan. That is, according to the present invention, the pre-loading applied on the bearing of the fan is adjustable. The present fan includes a stator, an elastic device, a first bearing, a second bearing, a first rigid spacer, a second rigid spacer, a rotor and a shaft. Among these, the stator includes a receptacle having the first threads formed thereon formed on the opposite ends.

The first rigid spacer is positioned in the receptacle. The first bearing is formed in the receptacle and further on the first rigid spacer. The elastic device is formed in the receptacle and further on the first bearing. The second bearing is formed in the receptacle and further on the elastic device. The second rigid spacer is formed in the receptacle and further on the second bearing. That is, the elastic device is directly compressed by and sandwiched between the first bearing and the second bearing. In addition, the elastic device is indirectly compressed by and sandwiched between the first rigid spacer and the second rigid spacer. In this manner, the first rigid spacer compresses the elastic device by means of the first bearing. Then, the elastic device applies pre-loading force on the first bearing due to the reactive force. Likewise, the second rigid spacer compresses the elastic device by means of the second bearing. Then, the elastic device applies pre-loading force on the second bearing due to the reactive force.

The rotor includes a blade structure. The shaft includes a first terminal, an opposite second terminal and a middle section interposed therebetween. Since the first terminal is coupled to the rotor, the shaft is able to rotate the blade structure of the rotor. Besides, the middle section sequentially passing through the first rigid spacer, the elastic device and the second rigid spacer is coupled to the inner rings of the first bearing and the second bearing.

The first bearing and the second bearing are composed of an inner ring, a plurality of balls and an outer ring, respectively. The balls couple the inner ring to the outer ring. During the inner ring rotates respective to the outer ring, the balls contact the inner ring and the outer ring, respectively.

The balls couple the inner ring to the outer ring. Therefore, there is a first contact formed between the inner ring and the ball. Besides, there is a second contact formed between the outer ring and the ball. Since the first rigid spacer and the opposite second rigid spacer isolate the blade structure from the elastic device, the blade structure which may vibrates does not affect the elastic device.

The pre-loading force applied by the elastic device on the first bearing and the second bearing is adjustable since the first rigid spacer and the second rigid spacer are coupled to the receptacle movably. For example, the user may alter the distance d between the first rigid spacer and the second rigid spacer to adjust the pre-loading force. Alternatively, the user alters the turns that the first thread meshes with the second thread to adjust the pre-loading force. The pre-loading force that the elastic device applies on the bearing is proportional to the turns.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention discloses an adjustable and stable pre-loading device equipped fan. That is, according to the present invention, the pre-loading applied on the bearing of the fan is adjustable.

Figure 1A:
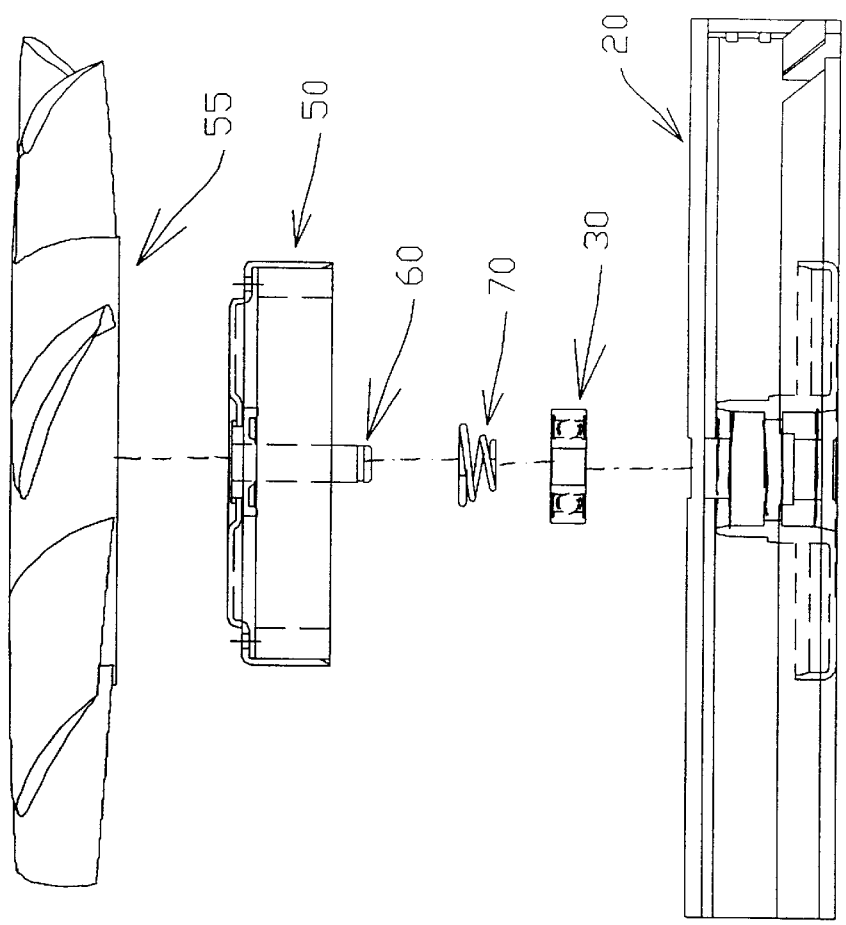
FIG. 1(a) depicts the exploded view illustrating the conventional fan.
Figure 1B:
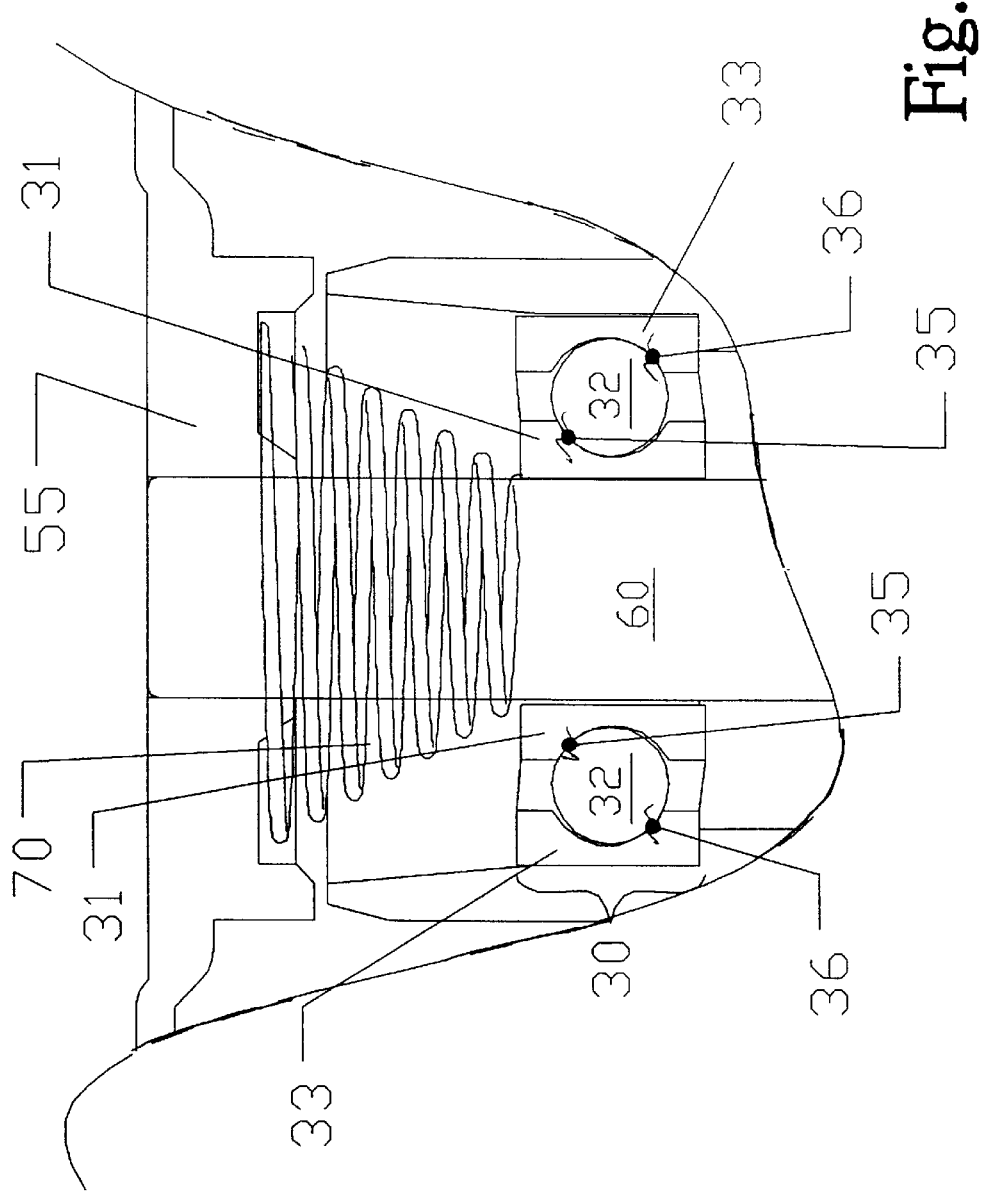
FIG. 1(b) depicts the partially enlarged view illustrating the bearing of the conventional fan shown in FIG. 1(a)
Figure 2:
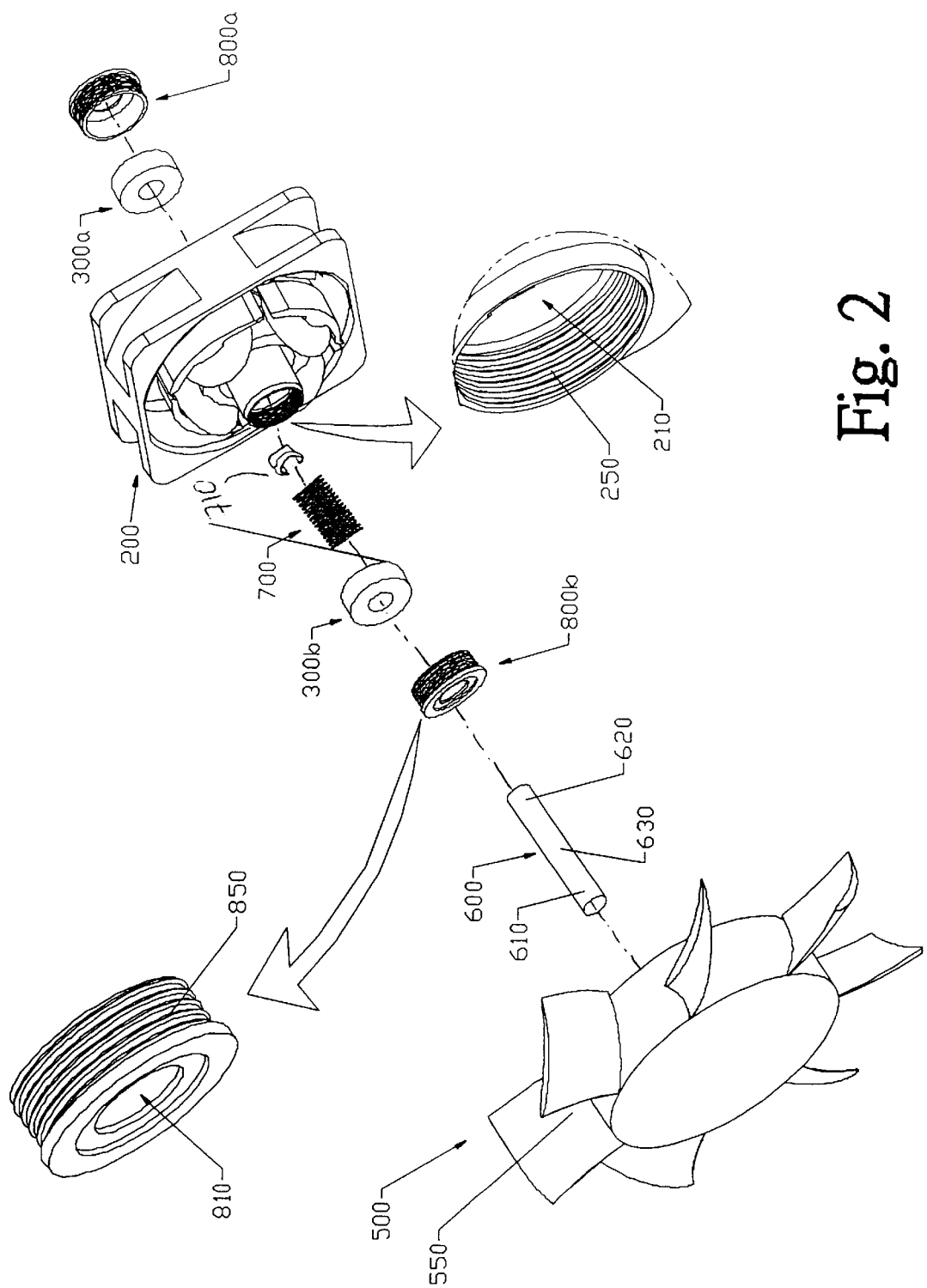
FIG. 2 depicts the exploded view illustrating the fan according to the present invention.

Referring to FIG. 2, the present fan includes a stator 200, an elastic device 700, a first bearing 300a, a second bearing 300b, a first rigid spacer 800a, a second rigid spacer 800b, a rotor 500 and a shaft 600. Among these, as shown in the enlarged portion, the stator 200 includes a receptacle 210 including the opposite ends having the first thread 250 formed thereon, respectively. However, FIG. 2 merely shows the first thread 250 formed on the upper end.

Still referring to FIG. 2, the first rigid spacer 800a is positioned in the receptacle 210. The first bearing 300a is formed in the receptacle 210 and further on the first rigid spacer 800a. The elastic device 700 is formed in the receptacle 210 and further on the first bearing 300a. The second bearing 300b is formed in the receptacle 210 and further on the elastic device. The second rigid spacer 800b is formed in the receptacle 210 and further on the second bearing 300b. That is, the elastic device 700 is directly compressed by and sandwiched between the first bearing 300a and the second bearing 300b. In addition, the elastic device 700 is indirectly compressed by and sandwiched between the first rigid spacer 800a and the second rigid spacer 800b. In this manner, the first rigid spacer 800a compresses the elastic device 700 by means of the first bearing 300a. Then, the elastic device 700 applies pre-loading force on the first bearing 300a due to the reactive force. Likewise, the second rigid spacer 800b compresses the elastic device 700 by means of the second bearing 300b. Then, the elastic device 700 applies pre-loading force on the second bearing 300b due to the reactive force.

Figure 3:
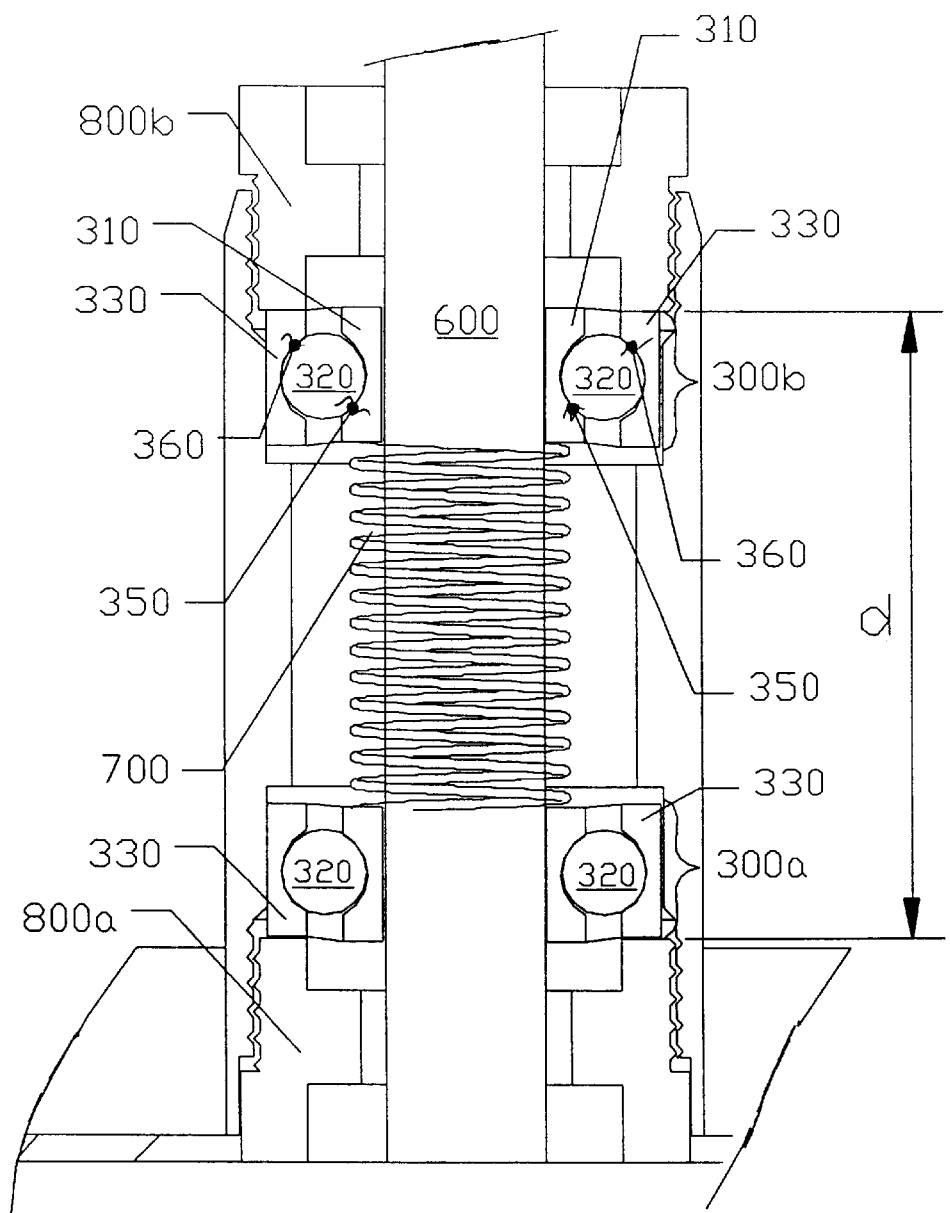
FIG. 3 depicts the partially enlarged view illustrating the bearing of the fan according to the present invention.

Referring to FIG. 3, the first bearing 300a and the second bearing 300b are composed of an inner ring 310, a plurality of balls 320 and an outer ring 330, respectively. The balls 320 couple the inner ring 310 to the outer ring 330. During the inner ring 310 rotates respective to the outer ring 330, the balls 320 contact the inner ring 310 and the outer ring 330, respectively.

Turning back to FIG. 2, the rotor 500 includes a blade structure 550. The shaft 600 includes a first terminal 610, an opposite second terminal 620 and a middle section 630 interposed therebetween. Since the first terminal 610 is coupled to the rotor 500, the shaft 600 is able to rotate the blade structure 550 of the rotor 500. Besides, the middle section 630 sequentially passing through the first rigid spacer 800a (i.e. passing through the central opening 810), the elastic device 700 and the second rigid spacer 800b (i.e. passing through the central opening 850 is coupled to the inner rings 310 of the first bearing 300a and the second bearing 300b. A fastening means, such as a C-ring 710, fastens the second terminal 620 exposed by the receptacle 210 to the stator 200 to avoid loosening.

Still referring to FIG. 2, the first rigid spacer 800a and the second rigid spacer 800b are coupled to the upper end and lower end of the receptacle 210, respectively. For example, but not limited to, the first rigid spacer 800a and the second rigid spacer 800b further include the respective second thread 850. In this manner, the second thread 850 and the first thread 250 of the receptacle 210 couple the first rigid spacer 800a with the upper end of the receptacle 210. Likewise, the second thread 850 and the first thread 250 of the receptacle 210 couple the second rigid spacer 800b with the lower end of the receptacle 210. Especially, the elastic device 700 is sandwiched between and indirectly compressed by the first rigid spacer 800a and the second rigid spacer 800b. Besides, the elastic device 700 is sandwiched between and directly compressed by the first bearing 300a and the second bearing 300b so that the elastic device 700 applies pre-loading force on the first bearing 300a and the second bearing 300b due to reactive force. In the preferred embodiment, the elastic device 700 includes a spring 700.

Referring to FIG. 3, as described above, the balls 320 couple the inner ring 310 to the outer ring 330. Therefore, there is a first contact 350 formed between the inner ring 310 and the ball 320. Besides, there is a second contact 360 formed between the outer ring 330 and the ball 320. However, only the first contact 350 and the second contact 360 of the first bearing 300a are depicted in FIG. 3. Since the first rigid spacer 800a and the opposite second rigid spacer 800b isolate the blade structure 550 from the elastic device 700, the blade structure 550 which may vibrates during the rotor 500 driven by the stator 200 rotates, the blade structure 550 does not affect the elastic device 700. On the other hand, the elastic device 700 compressed by the first rigid spacer 800a and the second rigid spacer 800b applies pre-loading force on the first bearing 300a and the second bearing 300b.

If the distance d between the first rigid spacer 800a and the second rigid spacer 800b is kept constant, the pre-loading force applied on the elastic device 700 is stable since the deformed length of the elastic device 700 is also kept constant. As such, the respective first contact 350 and the respective second contact 360 of the first bearing 300a and the second bearing 300b are maintained on the same position and do not move with the rotation of the blade structure. That is, the prior problems (i.e. shake, noise or abrasion) caused by the contacts moving with the vibration of the blade structure are effectively improved. Further, the pre-loading force applied by the elastic device 700 on the first bearing 300a and the second bearing 300b is adjustable since the first rigid spacer 800a and the second rigid spacer 800b are coupled to the receptacle 210 movably. For example, the user may alter the distance d between the first rigid spacer 800a and the second rigid spacer 800b to adjust the pre-loading force. Alternatively, the user alters the turns that the first thread 250 meshes with the second thread 850 to adjust the pre-loading force. The pre-loading force that the elastic device 700 applies on the bearing 300 is proportional to the turns. Although the preferred embodiment has illustrated the method for altering the pre-loading force, however, the skilled in the art can appreciate that the other methods for altering the distance d are still included by the spirit of the present invention.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An adjustable and stable pre-loading device equipped fan, comprising:

a stator, including a receptacle;

a first rigid spacer, formed in said receptacle;

a first bearing, formed in said receptacle and further on said first rigid spacer;

an elastic device, formed in the receptacle and further on said first bearing;

a second bearing, formed in the receptacle and further on said elastic device;

a second rigid spacer, formed in said receptacle and further on said second bearing;

a rotor, coupled to said stator and having a blade structure;

a shaft, having a first terminal, an opposite second terminal and a middle section, said first terminal coupled to said rotor, said middle section passing through said first rigid spacer, said second rigid spacer and said elastic device then coupled to said first bearing and said second bearing;

wherein said first rigid spacer compresses said elastic device by means of said first bearing, said second rigid spacer compresses said elastic device by means of said second bearing, and a distance between said first rigid spacer and said second rigid spacer is adjustable, thereby altering pre-loading applied on said first bearing and said second bearing.

2. The adjustable and stable pre-loading device equipped fan according to claim 1, wherein said first rigid spacer and said second rigid spacer are coupled to said receptacle by means of a thread, respectively.

3. The adjustable and stable pre-loading device equipped fan according to claim 1, wherein said second terminal passing through said receptacle is secured to said stator by a fastening means.

4. The adjustable and stable pre-loading device equipped fan according to claim 3, wherein said fastening means comprises a C-ring.

5. The adjustable and stable pre-loading device equipped fan according to claim 1, wherein said middle section is coupled to said inner ring of said first bearing.

6. The adjustable and stable pre-loading device equipped fan according to claim 5, wherein said first bearing further comprises:

an inner ring;

a plurality of balls; and an outer ring, coupled to said inner ring by means of said balls.

7. The adjustable and stable pre-loading device equipped fan according to claim 1, wherein said first bearing further comprises:

an inner ring;

a plurality of balls; and an outer ring, coupled to said inner ring by means of said balls.

8. The adjustable and stable pre-loading device equipped fan according to claim 7, wherein said middle section is coupled to said inner ring of said second bearing.

9. The adjustable and stable pre-loading device equipped fan according to claim 1, wherein said elastic device comprises a spring.

10. The adjustable and stable pre-loading device equipped fan according to claim 6, wherein said spring is coupled to said inner ring of said first bearing and said inner ring of said second bearing.

* * * * *